United States Patent [19]

Wohleber et al.

[11] 4,235,860

[45] Nov. 25, 1980

[54] CHLORINATION OF ALUMINOUS MATERIAL AT SUPERATMOSPHERIC PRESSURE

[75] Inventors: David A. Wohleber, Lower Burrell; Jon F. Edd, Monroeville; Ronald L. Hennrich, Pittsburgh, all of Pa.

[73] Assignee: Aluminum Company of America, Pittsburgh, Pa.

[21] Appl. No.: 46,460

[22] Filed: Jun. 7, 1979

[51] Int. Cl.³ .............................................. C01F 5/32
[52] U.S. Cl. .................................... 423/495; 423/496
[58] Field of Search ................................ 423/495, 496

[56] References Cited

U.S. PATENT DOCUMENTS

| | | | |
|---|---|---|---|
| 1,165,065 | 12/1915 | Brooks | 423/495 |
| 1,217,471 | 2/1917 | McAfee | 423/496 |
| 2,048,987 | 7/1936 | Atherholt | 423/496 |
| 3,842,163 | 10/1974 | Russell et al. | 423/496 |
| 3,930,800 | 1/1976 | Schoener et al. | 423/495 X |

FOREIGN PATENT DOCUMENTS 334132 12/1903 France .

Primary Examiner—Earl C. Thomas
Attorney, Agent, or Firm—Lyndanne M. Whalen; Daniel A. Sullivan

[57] ABSTRACT

Aluminous material is chlorinated in the presence of a reducing agent at pressures greater than three atmospheres. A greater than linear increase in reaction rate obtained at superatmospheric pressures is a feature of the chlorination reaction which is employed to increase aluminum chloride production rate. Choice of pressure used is governed more by mechanical limitations than by an upper limit inherent to the chemical reaction.

19 Claims, 3 Drawing Figures

EFFECT OF REACTOR PRESSURE ON ALUMINUM CHLORIDE

EFFECT OF PRESSURE ON AVERAGE MASS TRANSFER COEFFICIENT IN BATCH HIGH PRESSURE REACTOR

CHLORINATION OF ALUMINOUS MATERIAL AT SUPERATMOSPHERIC PRESSURE

BACKGROUND OF THE INVENTION

This invention relates to an improved method for chlorinating aluminous, oxygen-containing material in the presence of a reducing agent.

Chlorination of aluminous, oxygen-containing materials in the presence of a reducing agent, such as carbon, to produce aluminum chloride is well known. Various methods have been devised to improve the extent or quality of chlorination, but possible use of superatmospheric pressures is one approach that has not been explored to any great extent until the present. Pressure has been used to condense aluminum chloride vapors to promote melting of aluminum chloride (French Pat. No. 334,132), to force chlorine gas through molten aluminum (Brooks U.S. Pat. No. 1,165,065) and to form briquettes from coking coal and alumina or bauxite (McAfee U.S. Pat. No. 1,217,471). It was not recognized, however, until the present invention, that chlorinating an aluminous material in a reactor maintained at pressures greater than three atmospheres would have the advantages of both increasing the mass capacity of equipment by the factor F, $$\text{(where } F = \frac{\text{reactor pressure [psig]} + 14.7\text{ [psia]}}{14.7\text{ [psia]}}\text{)}$$

and increasing the degree of approach to complete gas conversion at constant gas-solids contact time. One explanation for this failure to seriously consider use of pressures greater than three atmospheres is that thermodynamic studies conducted at atmospheric pressure indicated that the reaction rate dependence on chlorine pressure was less than first order. Since a reaction which is less than first order with respect to chlorine pressure would be expected to yield a product at a rate-to-pressure ratio which diminishes with increasing pressure, those skilled in the art did not consider use of superatmospheric pressures as a worthwhile means for improving aluminum chloride production.

Russell et al U.S. Pat. No. 3,842,163 is one example which illustrates that some in the art who had considered use of superatmospheric pressures did not believe that increased reactor pressure would improve chlorination efficiency. While stating that pressures between 0.1 and 10 atmospheres may be used, the Russell et al patent indicates that chlorination is generally carried out at about one atmosphere, with pressures of 1-3 atmospheres described as preferred. While Russell et al stated that higher pressures permit a greater throughput which normally offsets any decrease in efficiency, operation at pressures higher than three atmospheres was not considered a sufficiently attractive procedure such that we have been able to find reports of actual trials in the literature.

Atherholt (U.S. Pat. No. 2,048,987) used pressures of two to three atmospheres to promote the reaction's approach to equilibrium and thereby cause a greater amount of aluminum chloride per pound of chlorine to be formed. Atherholt failed to realize, however, that by increasing mass flow through a reactor maintained at pressures greater than three atmospheres, the rate-to-pressure ratio would increase.

DEFINITIONS

As used herein:

Metal-grade alumina (MGA) is an alumina suited for the production of aluminum by the Hall Process, which has an alpha-alumina content greater than 10%.

Partially calcined alumina (PCA) is alumina having greater than 99% gamma or other transitional phase alumina and an alpha-alumina content of less than 1%.

B.E.T. refers to a method for measuring surface area which is described in Brunauer et al, 60 *Journal of American Chemical Society*, 309-19 (1938).

Kg-mol is a unit of measure which, when multiplied by the molecular weight of a compound, gives the weight of the compound in kilograms.

SUMMARY OF THE INVENTION

It is an object of the present invention to provide an improved reduction chlorination process. Such process includes the feature of maintaining a reactor pressure greater than three atmospheres. This superatmospheric pressure increases the aluminum chloride production rate coefficient to an unexpected degree. The aluminum chloride production rate coefficient is analogous to a mass transfer coefficient and differs from a mass transfer coefficient only in that the aluminum chloride production rate is measured in terms of volume rather than area.

DETAILED DESCRIPTION OF THE INVENTION

In accordance with the invention, an aluminous oxygen-containing material is chlorinated at a pressure greater than three atmospheres in the presence of a reducing agent with the preferred range being from 5 to 15 atmospheres, and the most preferred range being 7 to 15 atmospheres. Other pressure ranges suitable to the practice of this invention include pressures of 5 to 10 and 10 to 15 atmospheres. It should be noted, however, that choice of a particular pressure or pressure range is governed more by mechanical limitations than by an upper limit inherent to the reaction. The aluminous material may be a refined alumina, such as that from the Bayer process, a coked alumina, such as that described and claimed in Russell et al U.S. Pat. No. 3,842,163, or a raw material, such as bauxite or clay used in conjunction with a separate reducing agent. Appropriate reducing agents include sulfur, coke, finely divided carbon, carbon monoxide, $COCl_2$ and carbon tetrachloride.

The chlorination may be carried out under batch conditions or in a continuous manner.

The chlorination reaction may be carried out using any suitable apparatus which is capable of withstanding the superatmospheric pressures of this invention. The reactor system used to develop the data shown in the examples below will be described to illustrate one possible system.

Figure 3:
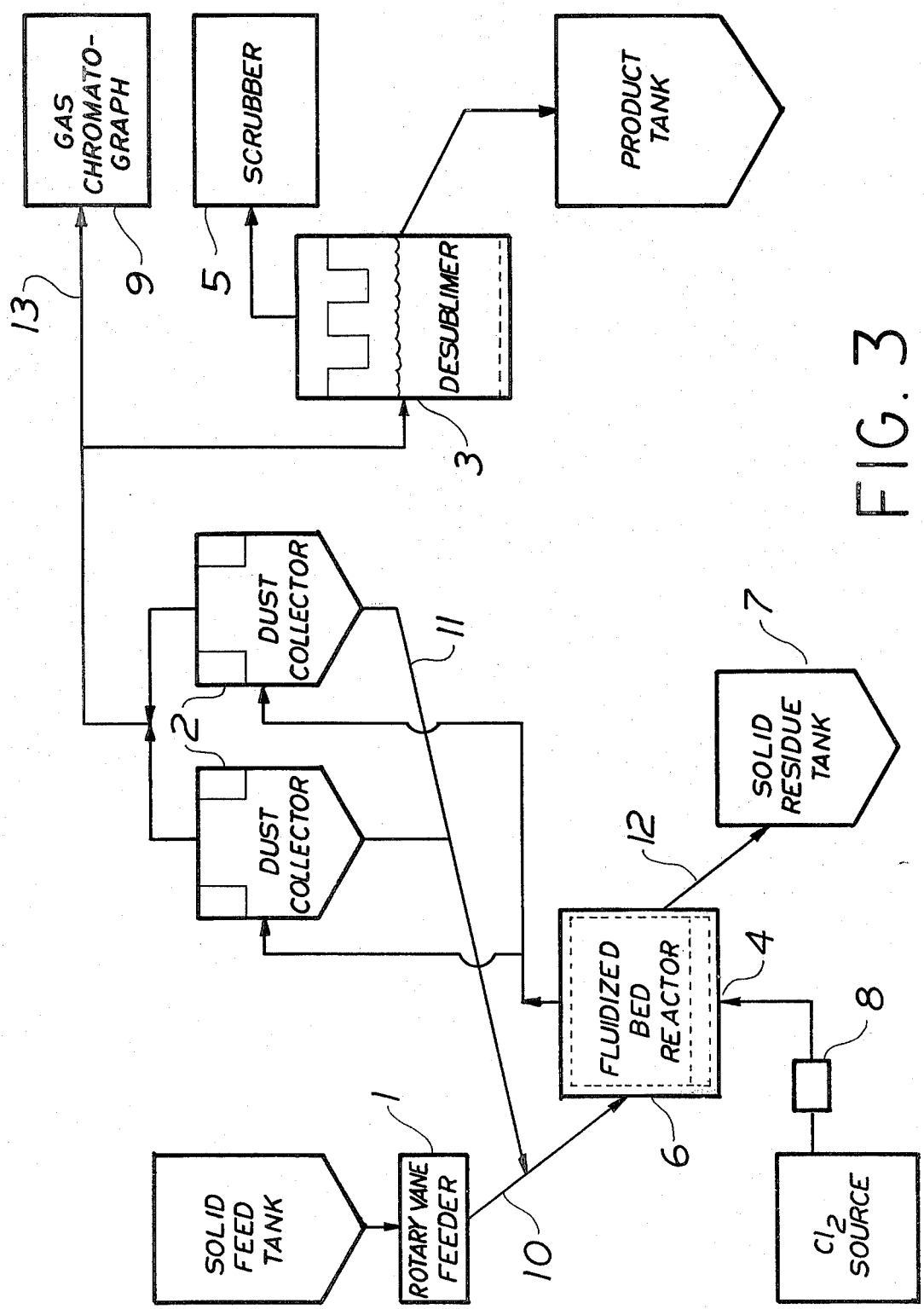
FIG. 3 shows a reactor system for chlorinating aluminous material at superatmospheric pressures.

The fluidized bed reactor 6 shown in FIG. 3 was in an electric furnace which contained a chlorine-resistant metal (e.g. the alloy nominally containing 80% Ni, 15% Cr and 5% Fe, and sold under the trademark INCONEL) shell lined with graphite. The fluidizing grid was a 0.64 cm thick mullite disc with three 0.32 cm diameter holes for distributing the chlorine gas, and a hole in the center for inserting a thermocouple into the bed. Lock chambers were pressurized with nitrogen to introduce solid feed into the reactor through line 10, to return dust through line 11, and to discharge solid residue from the bed to solid residue tank 7 through line 12. A small, continuous discharge of bed solids was overflowed to insure a constant bed depth. A quartz baffle was inserted in the graphite liner between the feed and discharge arms to prevent short circuiting of the solid feed out the discharge arm. A nitrogen purge was added at the liner bottom to prevent leaking of chlorine behind the graphite liner. This nitrogen purge represented a slight but negligible dilution of the chlorine feed gas. The solid feed rate was controlled by a rotary vane feeder 1. A programmable controller regulated the opening and closing of the lock chamber valves on a one-minute cycle.

The chlorine gas flow was controlled by plug valve 8. The chlorine mass flow was measured by a differential pressure transmitter. The mass flow signal was corrected for pressure and temperature deviations.

The reactor was contained in a five-zone electric furnace with the temperature in each zone being controlled separately. The bed temperature was measured by an internal thermocouple extending up through the center hole in the fluidizing grid to 15 cm above the fluidizing grid. The furnace zone temperatures were adjusted manually to maintain the desired reaction conditions.

Dust was filtered from the reactor product gas in two dust collectors 2 connected in parallel. The two collectors were both equipped with stone filters and hot nitrogen blowbacks for filter cleaning.

A sample stream 13 of the filtered process gas was bled off directly downstream of the dust collectors. The sample gas was passed through a quartz wool filter to remove final dust traces and then cooled to 50° C. in a water jacketed heat exchanger to condense and remove the metal chlorides before entering a gas chromatograph 9 for analysis of CO, $CO_2$, $Cl_2$, $COCl_2$ and $N_2$.

Electric heaters were installed on the offgas piping, dust collectors, gas sample line, and reactor sidearms to prevent condensation and plugging by metal chlorides. All offgas piping was Inconel metal pipe, including the gas sample line. All process valves were nickel ball valves with either metal or polytetrafluoroethylene seats depending upon the temperature service. Pressure taps were located throughout the reactor, offgas lines and dust collectors to measure pressure drops. All taps were purged with nitrogen to prevent plugging.

Reactor pressure was measured at the chlorine gas inlet 4 at the bottom of the reactor. The pressure control valve was positioned between the dust collectors and the desublimer.

A desublimer 3, such as that disclosed in U.S. Pat. No. 3,930,800 of Jan. 6, 1976, with a water-cooled heat exchanger and fluidized with air was used to condense and collect the aluminum chloride product. The desublimer offgas was sent to a caustic scrubber installation 5 for final treatment.

The runs described in Examples I through XVIII correspond to four to six hours of steady-state operation with continuous feeding and total dust return to the reactor. A constant bed depth of 70 cm was maintained, as mentioned above, by discharging a small amount of reactor bed solids (1–2 kg/hr) out of the reactor side arm discharge. The grid and fluidized bed pressure drops were typically 6 and 60 cm WC, respectively.

EXAMPLES I-IX

Coked alumina having a carbon content of 18 wt.%, 0.27 wt.% hydrogen, 0.6 wt.% alpha alumina and surface area of 8 $m^2/g$ (B.E.T.), was charged to the above-described reactor and chlorinated. Sodium chloride was added to the reactor with the alumina feed to react with some of the aluminum chloride product and thereby insure a high level of $NaAlCl_4$ catalyst in the chlorination reactor. The process parameters and results which are seen in Table 1 are visually represented in FIG. 1. It can be appreciated from study of Table 1 that chlorination at pressures of 3.3 to 4.7 atmospheres significantly improves the extent of the chlorination reaction as measured by the aluminum chloride production rate coefficient.

TABLE 1

| | | | Coked Alumina Examples | | |
|---|---|---|---|---|---|
| Expt. No. | Temp. (°C.) | Pres. (atm.) | Superficial Velocity (cm/sec) | $Al_2O_3$ Rate (kg/hr) | $AlCl_3$ Production Rate Coefficient (kg-mol/hr.$m^3$.atm) |
| I | 635 | 4.6 | 12.1 | 6.3 | 13.6 |
| II | 625 | 1.4 | 13.8 | 1.7 | 8.4 |
| III | 625 | 1.6 | 16.1 | 2.1 | 8.3 |
| IV | 625 | 3.4 | 6.5 | 1.8 | 7.5 |
| V | 625 | 3.3 | 13.2 | 6.2 | 10.7 |
| VI | 700 | 3.4 | 6.1 | 2.6 | 12.6 |
| VII | 8.3 | 3.1 | 4.4 | 8.3 | 10.5 |
| VIII | 700 | 4.6 | 6.2 | 2.2 | 10.1 |
| IX | 700 | 4.7 | 11.6 | 5.6 | 13.2 |

Calculation of the aluminum chloride production rate coefficient shown in the last column of Table 1 will be demonstrated using the data of Example I.

The pertinent experimental conditions and data of Example I are as follows:

| | |
|---|---|
| Reactor Pressure | 4.6 atm |
| Bed Depth | 0.7 m |
| Bed Diameter | 0.0825 m |
| $Cl_2$ Feed Rate | 9.8 kg/hr |
| $N_2$ Feed Rate | 0.14 kg/hr |
| Solids Feed Rate | 6.3 kg/hr |
| $H_2$ Content of Solid Feed | 0.27% |
| Reactor Temperature | 635° C. |
| Reactor Offgas Analysis | |
| $CO_2$ | 11.2% |
| CO | 0.0% |
| $Cl_2$ | 1.1% |
| $COCl_2$ | 0.8% |

The $AlCl_3$ volume percent concentration in the reactor product gas was calculated from the offgas analysis:

$$AlCl_3 = 4/3 CO_2 + \tfrac{2}{3}(CO + COCl_2)$$

$$AlCl_3 = 15.5\%$$

The product gas concentrations (without the $N_2$ content from pressure taps, filter blowbacks and purges) were normalized to 100%.

|       | Actual Vol. % | Normalized Vo. % |
|-------|---------------|------------------|
| $CO_2$   | 11.2          | 39.2             |
| CO    | 0.0           | 0.0              |
| $Cl_2$   | 1.1           | 3.8              |
| $COCl_2$ | 0.8           | 2.8              |
| $AlCl_3$ | 15.5          | 54.2             |
|       |               | 100.0%           |

The mols of product gas were calculated from the above normalized percentages and a $Cl_2$ mass balance.

Mols $Cl_2$ in product gas = Mols $Cl_2$ fed ($Cl_2$ + $COCl_2$ + (1.5 $AlCl_3$)) (mols of gas)/100 = ($Cl_2$ rate)/70.9 Mols of product gas = 0.15725 kg-mols/hr The $N_2$ dilution and HCl generation were next added to the above to determine the total mols of reactor offgas.

$N_2$ dilution = (0.14 kg/hr)/28 = 0.005 kg-m/hr

To determine HCl generation, it is assumed that the entire hydrogen content of solid feed reacts to form HCl.

| HCl generated | = 0.0027 × 6.3 |
|---|---|
|  | = 0.01701 kg-m/hr |
| Total mols reactor offgas | = 0.15725 + 0.005 + 0.01701 |
|  | = 0.17926 kg-m/hr |

The product gas concentrations including the $N_2$ and HCl values were renormalized to 100%.

|       | Normalized Vol. % |
|-------|-------------------|
| $CO_2$   | 34.4              |
| CO    | 0.0               |
| $Cl_2$   | 3.3               |
| $COCl_2$ | 2.5               |
| $AlCl_3$ | 47.5              |
| HCl   | 9.5               |
| $N_2$    | 2.8               |
|       | 100.0%            |

The normalized product gas concentrations, reactor pressure and reactor temperature were input into a computer program which estimates equilibrium partial pressures of the various gases based on thermodynamic values.

|       | Normalized Vol. % | Partial Pressures at Actual Temperature & Pressure (atm) |
|-------|-------------------|-----------------------------------------------------------|
| $CO_2$   | 34.4              | 1.75                                                      |
| CO    | 0.0               | 0.120                                                     |
| $Cl_2$   | 3.3               | 0.292                                                     |
| $COCl_2$ | 2.5               | 0.00512                                                   |
| $AlCl_3$ | 47.5              | 1.19                                                      |
| $Al_2Cl_6$ | —               | 0.615                                                     |
| HCl   | 9.5               | 0.483                                                     |
| $N_2$    | 2.8               | 0.142                                                     |
| Total | 100.0%            | 4.6 atm                                                   |

The log mean pressure of the chlorinating gas was calculated.

$$P_{lm} = \frac{P_i - P_o}{\ln(\frac{P_i}{P_o})}$$

$P_i$ ($N_2$ corrected) = ($Cl_2$ rate/70.9)/(($Cl_2$ rate/70.9) + ($N_2$ rate/28))$R_x$ pressure $P_i$ = 4.44 atm
$P_o$ = $P_{Cl_2}$ + $P_{COCl_2}$
    = 0.292 + 0.00512
    = 0.29712 atm $$P_{lm} = \frac{4.44 - 0.29712}{\ln(\frac{4.44}{0.29712})} = 1.523 \text{ atm}$$

The $AlCl_3$ production rate was calculated from the $Cl_2$ rate, and the $Cl_2$ conversion was corrected for HCl generation.

$$AlCl_3 \text{ rate} = \frac{Cl_2 \text{ rate} - (\text{Solid feed rate})(\% H/100)(35.45)}{70.9 (Cl_2 \text{ conversion})(P_{AlCl_3} + 2P_{Al_2Cl_6})}$$
$$\frac{}{1.5 P_{AlCl_3} + 3 P_{Al_2Cl_6}}$$

$AlCl_3$ rate = 0.079906 kg-m/hr

The bed volume for the pilot reactor was determined:

$$\text{Bed volume} = \frac{\pi (0.0825)^2}{4} \times 0.7$$

Bed volume = 0.003742 $m^3$

The aluminum chloride production rate coefficient (PRC) was then calculated:

PRC = ($AlCl_3$ rate)/(Bed volume × $P_{lm}$)

PRC = 13.9 kg/mol $AlCl_3$/hr.$m^3$.atm

The significance of the aluminum chloride production rate coefficient may best be appreciated in terms of chlorine pressure and a simple rate equation. Where the pressure effect of chlorine is less than first order, (i.e. rate = $k[p_{Cl_2}]^{>1}$), as is the case with chlorination of alumina at atmospheric pressure, the aluminum chloride production rate coefficient will decrease with increasing pressure. If the reaction rate is first order with respect to chlorine pressure, (i.e. rate = $k[p_{Cl_2}]^1$), the aluminum chloride production rate coefficient will remain constant with increasing pressures. When reaction rate dependence is greater than first order, (i.e. rate = $k[p_{Cl_2}]^{>1}$), as is the case in chlorination of alumina at superatmospheric pressures, the aluminum chloride production rate coefficient will increase with increasing pressure.

The aluminum chloride production rate coefficient was affected by fluidizing velocity, i.e. higher production rate coefficients are realized at higher fluidizing velocities. Apparently more efficient fluidization was achieved in the experiments performed at velocities of 12.1–13.8 cm/sec than those run at 6.1–8.3 cm/sec. The fact that the aluminum chloride production rate coefficient was still significantly higher (in all but one case) than that obtained at atmospheric pressure despite lower fluidizing velocities clearly indicates that increased pressures (i.e. pressures greater than three atmospheres) significantly affect the rate of aluminum chloride production as indicated by the aluminum chloride production rate coefficient.

EXAMPLES X–XIV

A mixture of PCA (79.4 wt.%), petroleum coke (19.9 wt.%), and sodium chloride (0.7 wt.%) was chlorinated in the reactor system seen in FIG. 3. The coke had been calcined at 825° C. for 30 minutes and sized to −210+105 microns (−65+150 mesh). The coke had a carbon content of 96.8 wt.%, 0.79 wt.% hydrogen, 0.52 wt.% nitrogen, 0.99 wt.% sulfur, 0.25 wt.% ash and surface area of 10 m$^2$/g. The alumina had the following analysis:

| | |
|---|---|
| Moisture | 1.30 wt.% |
| Loss on Ignition (LOI) | 1.29 |
| Alpha-alumina | 0.60 |
| Surface area | 98 m$^2$/g (B.E.T.) |
| Screen analysis | +149 microns - 2% |
| | +74 microns - 72% |
| | +44 microns - 96% |

Figure 1:
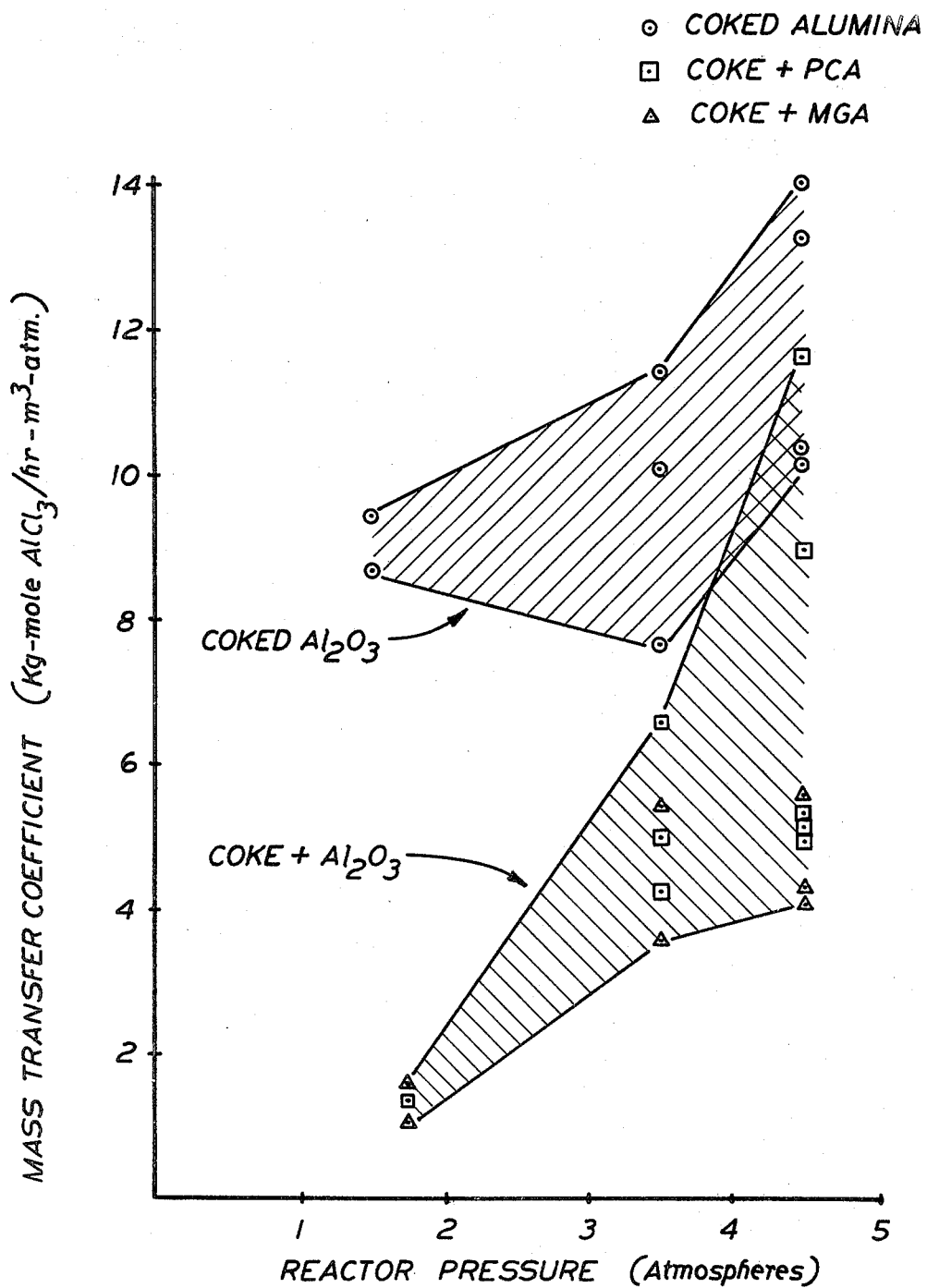
FIG. 1 is a comparative graph showing the effect of pressure on the aluminum chloride production rate coefficient for a coked alumina system, a PCA-coke mixture, and a MGA-coke mixture in a continuous chlorination process. The aluminum chloride production rate coefficient in kg-mols of $AlCl_3/hr.m^3.atm$ is plotted against the pressure in atmospheres.

Sodium chloride was added to the alumina to insure a high NaAlCl$_4$ catalyst level. The experimental conditions and aluminum chloride production rate coefficient are shown in Table 2. FIG. 1, which includes the data presented in Table 2, graphically shows the effect of pressure on aluminum chloride production rate.

Temperature does influence the aluminum chloride production rate coefficient when PCA is chlorinated at these pressures, but this temperature effect is not significant enough to seriously interfere with the chlorination. The fact that the aluminum chloride production rate coefficient decreased as the temperature was increased from 615° to 720° C. should not be construed as indicating that at higher temperatures and pressures, the aluminum chloride production rate coefficient is less than that obtained at atmospheric pressure. In fact, the aluminum chloride production rate coefficient is significantly greater at superatmospheric pressures despite this temperature effect. One possible explanation for this temperature effect is that for a mixture of coke and alumina, one stage of the reaction could be adsorption of chlorine on carbon to form a chlorinated carbon radical which then reacts with alumina. If sorption is involved, the reaction rate would decrease with increasing temperature. Another possibility is that the reaction proceeds through an intermediate, such as carbon tetrachloride, which is less stable at the higher temperature.

TABLE 2

Coke + Partially Calcined Alumina Examples
Bed Depth = 0.70 m

| Ex. No. | Temp. (°C.) | Pres. (atm.) | Velocity (cm/s) | Cl$_2$ Conversion (%) | Aluminum Chloride Production Rate Coefficient (kg-mol/hr·m$^3$·atm) |
|---|---|---|---|---|---|
| X | 615 | 3.5 | 6.4 | 89.2 | 6.5 |
| XI | 643 | 3.5 | 11.3 | 62.3 | 4.9 |
| XII | 635 | 4.4 | 6.4 | 98.7 | 11.6 |
| XIII | 650 | 4.5 | 11.5 | 82.5 | 8.9 |
| XIV | 620 | 1.8 | 9.9 | 23.4 | 1.3 |

EXAMPLES XV–XXI

A mixture of petroleum coke (19.9 wt.%), alumina (79.4 wt.%) and NaCl (0.7 wt.%) was chlorinated according to the procedure of Examples I through IX. The coke had the following analysis:

| | |
|---|---|
| Size fraction | −210 + 105 microns |
| Carbon | 96.80% |
| Hydrogen | 0.79% |
| Nitrogen | 0.52% |
| Sulfur | 0.99% |
| Ash | 0.28% |
| Surface area | 10 m$^2$/g (B.E.T.) |

The alumina (MGA) had the following analysis:

| | |
|---|---|
| Moisture (25°–300° C.) | 1.96% |
| Loss on Ignition (LOI) (1100° C.) | 1.28% |
| Alpha-phase content | 18.00% |
| Surface area | 54 m$^2$/g (B.E.T.) |
| Screen analysis | +149 microns - 4% |
| | +74 microns - 56% |
| | +44 microns - 76% |

The results shown below in Table 3 are visually represented in FIG. 1.

An approximate threefold increase in the aluminum chloride production rate coefficient was realized by increasing reaction pressure from 1.9 to 3.4 atmospheres. The slower rate of increase of the production rate coefficient between 3.4 and 4.5 atmospheres seen in FIG. 1 may have been caused by varying levels of reactive alumina and/or NaAlCl$_4$ in the reactor bed. Another possible explanation for this decreased improvement in production rate coefficient is the influence of fluidizing velocity upon the reaction. In both experiments at 3.5 atmospheres, the velocities exceeded 10 cm/sec while the two experiments at 4.5 atmospheres with the lowest aluminum chloride production rate coefficients were performed with fluidizing velocities between 6 and 7 cm/sec. More efficient fluidization of the beds with high sodium concentrations at velocities exceeding 10 cm/sec or the generation and return of larger quantities of reactive dust at the higher velocities could also explain this leveling.

TABLE 3

| Expt. No. | Temp. (°C.) | Pres. (atm.) | Velocity (cm/s) | Cl$_2$ Conversion (%) | Aluminum Chloride Production Rate Coefficient (kg-mol/hr·m$^3$·atm) |
|---|---|---|---|---|---|
| XV | 700 | 1.9 | 9.9 | 28.0 | 1.4 |
| XVI | 605 | 1.9 | 9.5 | 21.1 | 4.0 |
| XVII | 620 | 3.4 | 11.4 | 62.3 | 5.3 |
| XVIII | 700 | 3.6 | 12.5 | 47.5 | 3.5 |
| XIX | 625 | 4.6 | 6.1 | 77.3 | 4.0 |
| XX | 700 | 4.5 | 6.6 | 77.1 | 4.1 |
| XXI | 630 | 4.4 | 10.7 | 67.0 | 5.4 |

Examples XXII through XXV were run in a bench scale quartz fluid bed reactor on a batch basis.

EXAMPLE XXII

Two experiments using coked alumina (17.9% carbon) at 0.3 m initial bed height and 8 cm/sec chlorine superficial velocity were run, one at five atmospheres and the other at 15 atmospheres. The coked alumina had the following analysis:

| | |
|---|---|
| Alpha alumina | 0.3% |
| Na$_2$O | 0.23% |

-continued

| | |
|---|---|
| LOI (0°–1100° C.) | 19.5% |
| Surface Area | 8 m²/g (B.E.T.) |

At five atmospheres and 700° C., the chlorine conversion was 97.2% yielding an aluminum chloride production rate coefficient of 29.1 kg-mols aluminum chloride per meter³ hour atmosphere. At 15 atmospheres and 715° C., the chlorine conversion was 99.7% yielding an aluminum chloride production rate coefficient of 52.1 kg-mols aluminum chloride per meter³ hour atmosphere.

EXAMPLE XXIII

Two experiments using partially calcined alumina (79.4 wt.%) and separate petroleum coke (19.9 wt.%) and sodium chloride (0.7 wt.%) were run at 0.27 meter initial bed height and 8 cm/sec chlorine superficial velocity, one at five atmospheres and the other at 10 atmospheres. The alumina had the following analysis:

| | |
|---|---|
| Alpha alumina | 0.4% |
| Na₂O | 0.35% |
| Moisture (0°–300° C.) | 1.11% |
| LOI (300°–1200° C.) | 1.02% |

The coke used had been calcined at 825° C. for 30 minutes and sized to −65+150 mesh. At five atmospheres and 695° C., the chlorine conversion was 59.6% yielding an aluminum chloride production rate coefficient of 7.69 kg-mols aluminum chloride per m³ hour atmosphere. At 10 atmospheres and 690° C., the chlorine conversion was 69.6% yielding an aluminum chloride production rate coefficient of 10.7 kg-mols of aluminum chloride per m³ hour atmosphere.

EXAMPLE XXIV

Four experiments using alumina (MGA) (79.4 wt.%), sodium chloride (0.7 wt.%) and separate petroleum coke (19.9 wt.%) were run at 8 cm/sec chlorine superficial velocity, two at five atmospheres and two at 10 atmospheres. The alumina had the following analysis:

| | |
|---|---|
| Surface area | 59 m²/gm (B.E.T.) |
| Alpha alumina | 17.0% |
| Na₂O | 0.54% |
| Moisture (0°–300° C.) | 1.68% |
| LOI (300°–1200° C.) | 0.88% |

The coke which had been calcined at 825° C. for 30 minutes had the following analysis:

| | |
|---|---|
| Size fraction | −210 + 105 microns |
| Surface area | 10 m²/g (B.E.T.) |
| Carbon | 96.8% |
| Hydrogen | 0.79% |
| Nitrogen | 0.52% |
| Sulfur | 0.99% |
| Ash | 0.28% |

One of the two samples chlorinated at five atmospheres was run at 0.53 m initial bed height and 650° C. The chlorine conversion was 96% yielding an aluminum chloride production rate coefficient of 15.3 kg-mols aluminum chloride per meter³ hour atmospheres. The other at five atmospheres was run at 0.56 m initial bed height and 650° C. The chlorine conversion was 97.2% yielding an aluminum chloride production rate coefficient of 16.2 kg-mols aluminum chloride per meter³ hour atmosphere. One of the two samples chlorinated at 10 atmospheres was run at 0.53 m initial bed height and 665° C. The chlorine conversion was 99.6% yielding an aluminum chloride production rate coefficient of 26.7 kg-mols aluminum chloride per meter³ hour atmosphere. The other at 10 atmospheres was run at 0.56 m initial bed height and 655° C. The chlorine conversion was 99.6% yielding an aluminum chloride production rate coefficient of 25.2 kg-mols aluminum chloride per meter³ hour atmosphere.

EXAMPLE XXV

Alumina (80 wt.%) and petroleum coke (20 wt.%) (−65 to +150 mesh) were reacted at 8 cm/sec chlorine superficial velocity, 700° C., 0.58 m initial bed height at 5, 7, 9, 11 and 13 atmospheres. The alumina had the following analysis:

| | |
|---|---|
| Surface area | 0.3 m²/g (B.E.T.) |
| Alpha alumina | 85.0% |
| Beta alumina | 15.0 % |
| Na₂O | 0.61% |
| Moisture (0°–300° C.) | 0.25% |
| LOI (300°–1200° C.) | 0.06% |

Figure 2:
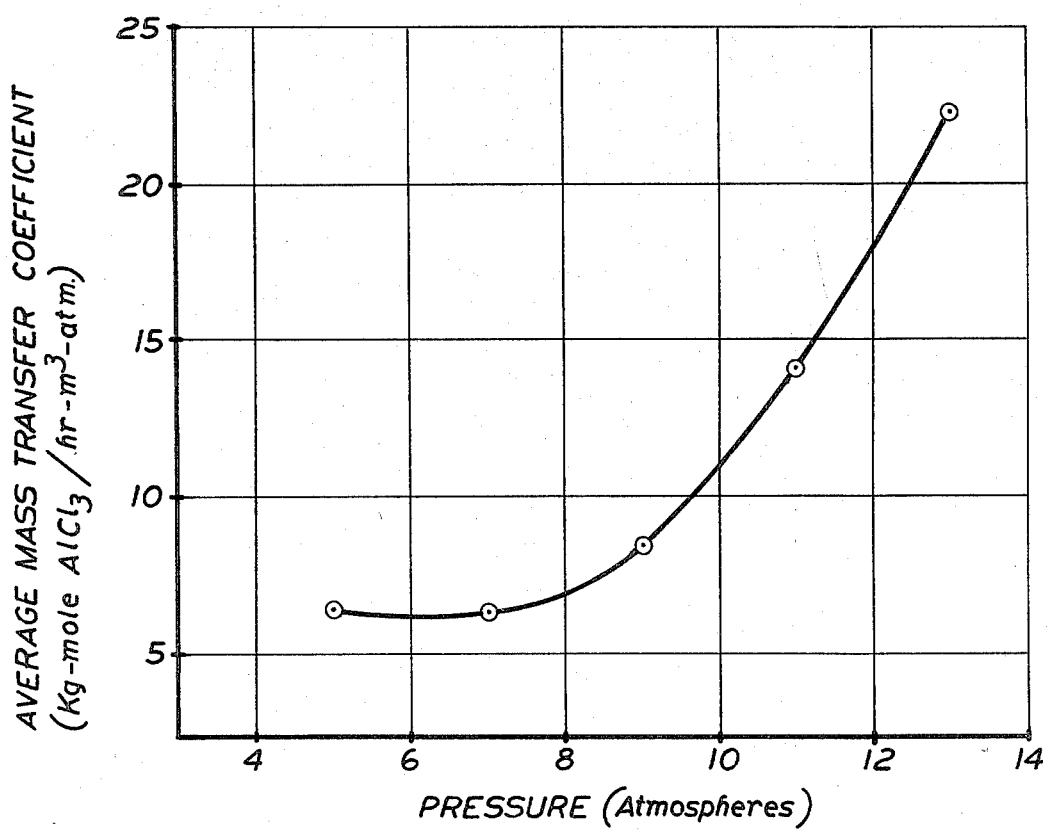
FIG. 2 is a plot which shows the effect of pressure on the average aluminum chloride production rate coefficient in a batch high pressure reactor.

The coke had the same analysis as that of Example XXI. Each run was terminated when 90% of theoretical chlorine had been delivered. The results are graphically illustrated in FIG. 2 where the average aluminum chloride production rate coefficient is plotted against pressure in atmospheres. The average aluminum chloride production rate coefficient is an arithmetic average of all the instantaneous readings taken calculated by assuming a constant bed volume.

These comparisons show that the rate dependence on chlorine pressure is greater than one since both chlorine conversions and aluminum chloride production rate coefficients increased substantially as the pressure increased.

It will be apparent to those skilled in the art that numerous variations of the illustrated details may be made without departing from this invention.

What is claimed is:

1. A method for chlorinating an aluminous material containing oxygen comprising chlorinating the aluminous material in the presence of a reducing agent at a pressure of greater than three atmospheres, with the aluminum chloride production rate coefficient being increased compared with what it is at pressures below three atmospheres.

2. The method of claim 1 wherein the pressure is at most 15 atmospheres.

3. The method of claim 1 wherein the aluminous material is chlorinated at a temperature of from 550° to 800° C.

4. The method of claim 1 wherein the reducing agent is selected from the group consisting of coke, carbon, carbon monoxide, COCl₂ and CCl₄.

5. The method of claim 1 wherein the aluminous material is alumina.

6. A method for the chlorination of an aluminous material containing oxygen, which comprises chlorinating the aluminous material in a pressure reactor at a pressure in excess of three atmospheres at a temperature of from 550° to 800° C. in the presence of a carbonaceous reducing agent selected from the group consisting of coke, carbon, carbon monoxide, $COCl_2$ and $CCl_4$, with the aluminum chloride production rate coefficient being increased compared with what it is at pressures below three atmospheres.

7. The method of claim 1 wherein the aluminous, oxygen-containing material is calcined before being chlorinated.

8. In a method for chlorinating an aluminum-oxygen containing material in the presence of a carbonaceous reducing agent, the improvement comprising chlorinating at a pressure greater than three atmospheres, with the aluminum chloride production rate coefficient being increased compared with what it is at pressures below three atmospheres.

9. The method of claim 1 wherein the pressure is between 3.3 and 4.7 atmospheres.

10. The method of claim 1 wherein the pressure is at least five atmospheres.

11. The method of claim 1 wherein the pressure is at least 15 atmospheres.

12. The method of claim 1 wherein the pressure is at least 10 atmospheres.

13. The method of claim 1 wherein the pressure is at least seven atmospheres.

14. The method of claim 1 wherein the pressure is at least nine atmospheres.

15. The method of claim 1 wherein the pressure is at least 11 atmospheres.

16. The method of claim 1 wherein the pressure is at least 13 atmospheres.

17. The method of claim 1 wherein the pressure is between 5 and 15 atmospheres.

18. The method of claim 1 wherein the pressure is between 5 and 10 atmospheres.

19. The method of claim 1 wherein the pressure is between 10 and 15 atmospheres.

* * * * *

UNITED STATES PATENT AND TRADEMARK OFFICE
CERTIFICATE OF CORRECTION

PATENT NO. : 4,235,860
DATED : November 25, 1980
INVENTOR(S) : David A. Wohleber et al.

It is certified that error appears in the above-identified patent and that said Letters Patent are hereby corrected as shown below:

On the title page:
In the Heading "Inventors"     Insert the following inventor's name and location:
--Franciscus A. Plantenberg, Zoetermeer, Netherlands--.

Table 1, line 7,     Change the following from:
"VII   8.3   3.1   4.4   8.3"
to
--VII   625   4.4   8.3   3.1--.

Column 5, line 6 (Heading)     After "Normalized", change "Vo. %" to --Vol. %--.

Signed and Sealed this

Eleventh Day of January 1983

[SEAL]

Attest:

GERALD J. MOSSINGHOFF

Attesting Officer     Commissioner of Patents and Trademarks